US012812094B2

(12) United States Patent
Peringassery Krishnan et al.

(10) Patent No.: US 12,812,094 B2
(45) Date of Patent: Nov. 24, 2026

(54) INTRA TEMPLATE MATCHING PREDICTION FUSION USING BLENDING MASKS

(71) Applicant: Tencent America LLC, Palo Alto, CA (US)

(72) Inventors: Madhu Peringassery Krishnan, Mountain View, CA (US); Lien-fei Chen, Palo Alto, CA (US); Roman Chernyak, Santa Clara, CA (US); Biao Wang, San Jose, CA (US); Xin Zhao, San Jose, CA (US); Shan Liu, San Jose, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

(21) Appl. No.: 19/261,981

(22) Filed: Jul. 7, 2025

(65) Prior Publication Data

US 2025/0337887 A1 Oct. 30, 2025

Related U.S. Application Data

(63) Continuation of application No. PCT/US2024/025566, filed on Apr. 19, 2024.

(Continued)

(51) Int. Cl.

*H04N 19/105* (2014.01)
*H04N 19/117* (2014.01)

(Continued)

(52) U.S. Cl.

CPC ......... *H04N 19/105* (2014.11); *H04N 19/117* (2014.11); *H04N 19/176* (2014.11); *H04N 19/593* (2014.11)

(58) Field of Classification Search

CPC .. H04N 19/105; H04N 19/117; H04N 19/176; H04N 19/593

(Continued)

(56) References Cited

U.S. PATENT DOCUMENTS

| | | | | |
|---|---|---|---|---|
| 2021/0195227 | A1 | 6/2021 | Lee et al. | |
| 2025/0024067 | A1 * | 1/2025 | Bordes | H04N 19/52 |

(Continued)

FOREIGN PATENT DOCUMENTS

| | | | |
|---|---|---|---|
| WO | 2023025114 | A1 | 3/2023 |
| WO | 2023046955 | A1 | 3/2023 |

OTHER PUBLICATIONS

International Search Report and Written Opinion for International Application No. PCT/US2024/25566 mailed on Aug. 7, 2024, 14 pages.

*Primary Examiner* — Tung T Vo

(74) *Attorney, Agent, or Firm* — ARENTFOX SCHIFF LLP

(57) ABSTRACT

An apparatus includes processing circuitry. The processing circuitry is configured to determine a plurality of candidate prediction blocks for a current block based on a cost value between a template of each of the plurality of candidate prediction blocks and a template of the current block according to intraTMP. The processing circuitry is configured to determine a plurality of masks for the plurality of candidate prediction blocks. The respective mask for each of the plurality of candidate prediction blocks includes a respective weighting matrix with a plurality of weighting values. The processing circuitry is configured to reconstruct the current block based on a fused prediction block that is a sum of weighted prediction blocks. Each weighted prediction block is equal to a product of the mask of a respective candidate (Continued)

prediction block of the plurality of candidate prediction blocks and the respective candidate prediction block.

20 Claims, 7 Drawing Sheets

Related U.S. Application Data

(60) Provisional application No. 63/460,881, filed on Apr. 20, 2023.

(51) Int. Cl.
*H04N 19/176* (2014.01)
*H04N 19/593* (2014.01)

(58) Field of Classification Search
USPC ........................................................ 375/240.12
See application file for complete search history.

(56) References Cited

U.S. PATENT DOCUMENTS

| | | | | |
|---|---|---|---|---|
| 2025/0133216 | A1* | 4/2025 | Poirier | H04N 19/167 |
| 2025/0234034 | A1* | 7/2025 | Tsai | H04N 19/593 |
| 2025/0254321 | A1* | 8/2025 | Tsai | H04N 19/139 |
| 2025/0254336 | A1* | 8/2025 | Poirier | H04N 19/17 |
| 2025/0260828 | A1* | 8/2025 | Tsai | H04N 19/176 |
| 2025/0267277 | A1* | 8/2025 | Laroche | H04N 19/176 |

* cited by examiner

INTRA TEMPLATE MATCHING PREDICTION FUSION USING BLENDING MASKS

INCORPORATION BY REFERENCE

The present application is a continuation of International Application No. PCT/US2024/025566, filed on Apr. 19, 2024, which claims the benefit of priority to U.S. Provisional Application No. 63/460,881, "INTRA TEMPLATE MATCHING PREDICTION FUSION USING BLENDING MASKS" filed on Apr. 20, 2023. The entire disclosures of the prior applications are hereby incorporated by reference in their entirety.

TECHNICAL FIELD

The present disclosure describes aspects generally related to video coding.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Image/video compression can help transmit image/video data across different devices, storage and networks with minimal quality degradation. In some examples, video codec technology can compress video based on spatial and temporal redundancy. In an example, a video codec can use techniques referred to as intra prediction that can compress an image based on spatial redundancy. For example, the intra prediction can use reference data from the current picture under reconstruction for sample prediction. In another example, a video codec can use techniques referred to as inter prediction that can compress an image based on temporal redundancy. For example, the inter prediction can predict samples in a current picture from a previously reconstructed picture with motion compensation. The motion compensation can be indicated by a motion vector (MV).

SUMMARY

Aspects of the disclosure include bitstreams, methods, and apparatuses for video encoding/decoding. In some examples, an apparatus for video encoding/decoding includes processing circuitry.

According to an aspect of the disclosure, a method of processing visual media data is provided. In the method, a conversion between a visual media file and a bitstream of visual media data is performed according to a format rule. The bitstream includes coded information indicating that intra template matching prediction (intraTMP) is applied to a current block in a current picture. The format rule specifies that a plurality of candidate prediction blocks is determined for the current block based on a cost value between a template of each of the plurality of candidate prediction blocks and a template of the current block according to the intraTMP. The format rule specifies that a plurality of masks is determined for the plurality of candidate prediction blocks. The respective mask for each of the plurality of candidate prediction blocks includes a respective weighting matrix with a plurality of weighting values corresponding to samples in the respective candidate prediction block. The mask of the respective candidate prediction block has a matrix dimension that is equal to a dimension of the respective candidate prediction block. The format rule specifies that a fused prediction block is a sum of weighted prediction blocks. Each weighted prediction block is equal to a product of the mask of a respective candidate prediction block of the plurality of candidate prediction blocks and the respective candidate prediction block. The format rule specifies that samples in the sum of the weighted prediction blocks are filtered based on a filter. The format rule specifies that the current block is processed based on the filtered samples in the sum of the weighted prediction blocks.

In an example, the format rule specifies that one or more candidate prediction blocks are selected from the plurality of candidate prediction blocks when the cost values of the one or more candidate prediction blocks are equal to or less than a threshold value. The format rule specifies that the weighted prediction blocks are determined based on the selected one or more candidate prediction blocks. The format rule specifies that the fused prediction block is determined as the sum of the weighted prediction blocks.

In an example, the format rule specifies that, when one of the plurality of candidate prediction blocks is selected, the fused prediction block is determined as a sum of a first weighted prediction block and a second weighted prediction block. The first weighted prediction block is equal to a product of the selected one of the plurality of candidate prediction blocks and a first mask of the plurality of masks. The second weighted prediction block is equal to a product of an intra predictor derived by a planar mode and a second mask of the plurality of masks.

In an example, a sum of a weighting value in a position of the first mask and a weighting value in a collocated position of the second mask is a constant value.

In an example, the format rule specifies that a plurality of candidate masks is determined for a first candidate prediction block of the plurality of candidate prediction blocks. The format rule specifies that each of the plurality of candidate masks is applied to the template of the current block and the template of the first candidate prediction block to obtain a plurality of cost values. The format rule specifies that the mask for the first candidate prediction block is determined from the plurality of candidate masks that corresponds to a minimum cost value of the cost values.

In an example, the coded information further includes a first flag that indicates whether the current block is predicted using the fused prediction block. The format rule specifies that, when the first flag indicates that the current block is predicted using the fused prediction block, the fused prediction block is determined based on the sum of the weighted prediction blocks.

According to another aspect of the disclosure, a method of video encoding is provided. In the method, a plurality of candidate prediction blocks is determined for a current block based on a cost value between a template of each of the plurality of candidate prediction blocks and a template of the current block according to intra template matching prediction (intraTMP). A plurality of masks is determined for the plurality of candidate prediction blocks. The respective mask for each of the plurality of candidate prediction blocks includes a respective weighting matrix with a plurality of weighting values corresponding to samples in the respective candidate prediction block. The mask of the respective candidate prediction block has a matrix dimension that is equal to a dimension of the respective candidate prediction block. The current block is encoded based on a fused prediction block that is a sum of weighted prediction blocks. Each weighted prediction block is equal to a product of the mask of a respective candidate prediction block of the plurality of candidate prediction blocks and the respective candidate prediction block.

In an example, one or more candidate prediction blocks are selected from the plurality of candidate prediction blocks when the cost values of the one or more candidate prediction blocks are equal to or less than a threshold value. The weighted prediction blocks are determined based on the selected one or more candidate prediction blocks. The fused prediction block is determined based on the sum of the weighted prediction blocks.

In an example, when one of the plurality of candidate prediction blocks is selected, the fused prediction block is determined as a sum of a first weighted prediction block and a second weighted prediction block. The first weighted prediction block is equal to a product of the selected one of the plurality of candidate prediction blocks and a first mask of the plurality of masks. The second weighted prediction block is equal to a product of an intra predictor derived by a planar mode and a second mask of the plurality of masks.

In an example, a sum of a weighting value in a position of the first mask and a weighting value in a collocated position of the second mask is a constant value.

In an example, a plurality of candidate masks is determined for a first candidate prediction block of the plurality of candidate prediction blocks. Each of the plurality of candidate masks is applied to the template of the current block and the template of the first candidate prediction block to obtain a plurality of cost values. The mask for the first candidate prediction block is determined from the plurality of candidate masks that corresponds to a minimum cost value of the cost values.

According to yet another aspect of the disclosure, an apparatus for video decoding is provided. The apparatus includes processing circuitry. The processing circuitry is configured to receive a video bitstream including coded information associated with a current block in a current picture. The coded information indicates that intraTMP is applied to the current block. The processing circuitry is configured to determine a plurality of candidate prediction blocks for the current block based on a cost value between a template of each of the plurality of candidate prediction blocks and a template of the current block according to the intraTMP. The processing circuitry is configured to determine a plurality of masks for the plurality of candidate prediction blocks. The respective mask for each of the plurality of candidate prediction blocks includes a respective weighting matrix with a plurality of weighting values corresponding to samples in the respective candidate prediction block. The processing circuitry is configured to reconstruct the current block based on a fused prediction block that is a sum of weighted prediction blocks. Each weighted prediction block is equal to a product of the mask of a respective candidate prediction block of the plurality of candidate prediction blocks and the respective candidate prediction block.

In an example, the mask of the respective candidate prediction block has a matrix dimension that is equal to a dimension of the respective candidate prediction block. Each of the plurality of weighting values in the mask of the respective candidate prediction block corresponds to a respective sample of the samples in the respective candidate prediction block.

In an example, the processing circuitry is configured to select one or more candidate prediction blocks from the plurality of candidate prediction blocks when the cost values of the one or more candidate prediction blocks are equal to or less than a threshold value. The processing circuitry is configured to determine the weighted prediction blocks based on the selected one or more candidate prediction blocks. The processing circuitry is configured to determine the fused prediction block based on the sum of the weighted prediction blocks.

In an example, when one of the plurality of candidate prediction blocks is selected, the processing circuitry is configured to determine the fused prediction block as a sum of a first weighted prediction block and a second weighted prediction block. The first weighted prediction block is equal to a product of the selected one of the plurality of candidate prediction blocks and a first mask of the plurality of masks. The second weighted prediction block is equal to a product of an intra predictor derived by a planar mode and a second mask of the plurality of masks.

In an example, a sum of a weighting value in a position of the first mask and a weighting value in a collocated position of the second mask is a constant value.

In an example, the processing circuitry is configured to determine a plurality of candidate masks for a first candidate prediction block of the plurality of candidate prediction blocks. The processing circuitry is configured to apply each of the plurality of candidate masks to the template of the current block and the template of the first candidate prediction block to obtain a plurality of cost values. The processing circuitry is configured to determine the mask for the first candidate prediction block from the plurality of candidate masks that corresponds to a minimum cost value of the cost values.

In an example, the processing circuitry is configured to filter samples in the sum of the weighted prediction blocks based on a filter. The processing circuitry is configured to determine the fused prediction block based on the filtered samples in the sum of the weighted prediction blocks.

In an example, the coded information further includes a first flag that indicates whether the current block is predicted using the fused prediction block. The processing circuitry is configured to, when the first flag indicates that the current block is predicted using the fused prediction block, determine the fused prediction block based on the sum of the weighted prediction blocks.

In an example, the coded information further includes a second flag that indicates whether the samples in the sum of the weighted prediction blocks are filtered by a filter. When the second flag indicates that the samples in the sum of the weighted prediction blocks are to be filtered by the filter, the processing circuitry is configured to (i) filter the samples in the sum of the weighted prediction blocks based on the filter and (ii) determine the fused prediction block based the filtered samples in the sum of the weighted prediction blocks.

Aspects of the disclosure also provide an apparatus for video encoding. The apparatus for video encoding including processing circuitry configured to implement any of the described methods for video encoding.

Aspects of the disclosure also provide a method for video decoding. The method including any of the methods implemented by the apparatus for video decoding.

Aspects of the disclosure also provide a non-transitory computer-readable medium storing instructions which, when executed by a computer, cause the computer to perform any of the described methods for video decoding/encoding.

BRIEF DESCRIPTION OF THE DRAWINGS

Further features, the nature, and various advantages of the disclosed subject matter will be more apparent from the following detailed description and the accompanying drawings in which.

DETAILED DESCRIPTION

Figure 1:
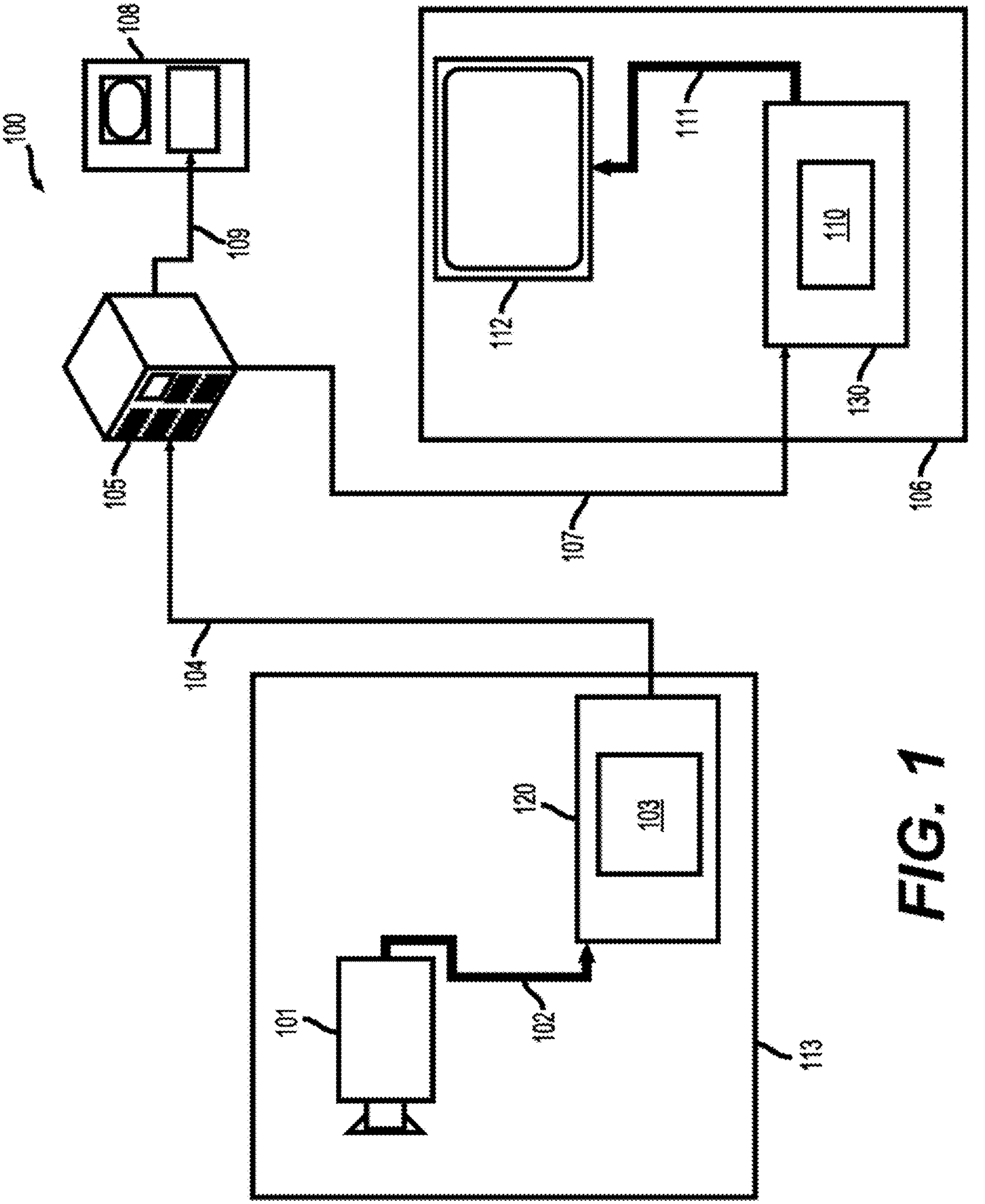
FIG. 1 is a schematic illustration of an example of a block diagram of a communication system (100).

FIG. 1 shows a block diagram of a video processing system (100) in some examples. The video processing system (100) is an example of an application for the disclosed subject matter, a video encoder and a video decoder in a streaming environment. The disclosed subject matter can be equally applicable to other video enabled applications, including, for example, video conferencing, digital TV, streaming services, storing of compressed video on digital media including CD, DVD, memory stick and the like, and so on.

The video processing system (100) includes a capture subsystem (113), that can include a video source (101), for example a digital camera, creating for example a stream of video pictures (102) that are uncompressed. In an example, the stream of video pictures (102) includes samples that are taken by the digital camera. The stream of video pictures (102), depicted as a bold line to emphasize a high data volume when compared to encoded video data (104) (or coded video bitstreams), can be processed by an electronic device (120) that includes a video encoder (103) coupled to the video source (101). The video encoder (103) can include hardware, software, or a combination thereof to enable or implement aspects of the disclosed subject matter as described in more detail below. The encoded video data (104) (or encoded video bitstream), depicted as a thin line to emphasize the lower data volume when compared to the stream of video pictures (102), can be stored on a streaming server (105) for future use. One or more streaming client subsystems, such as client subsystems (106) and (108) in FIG. 1 can access the streaming server (105) to retrieve copies (107) and (109) of the encoded video data (104). A client subsystem (106) can include a video decoder (110), for example, in an electronic device (130). The video decoder (110) decodes the incoming copy (107) of the encoded video data and creates an outgoing stream of video pictures (111) that can be rendered on a display (112) (e.g., display screen) or other rendering device (not depicted). In some streaming systems, the encoded video data (104), (107), and (109) (e.g., video bitstreams) can be encoded according to certain video coding/compression standards. Examples of those standards include ITU-T Recommendation H.265. In an example, a video coding standard under development is informally known as Versatile Video Coding (VVC). The disclosed subject matter may be used in the context of VVC.

It is noted that the electronic devices (120) and (130) can include other components (not shown). For example, the electronic device (120) can include a video decoder (not shown) and the electronic device (130) can include a video encoder (not shown) as well.

Figure 2:
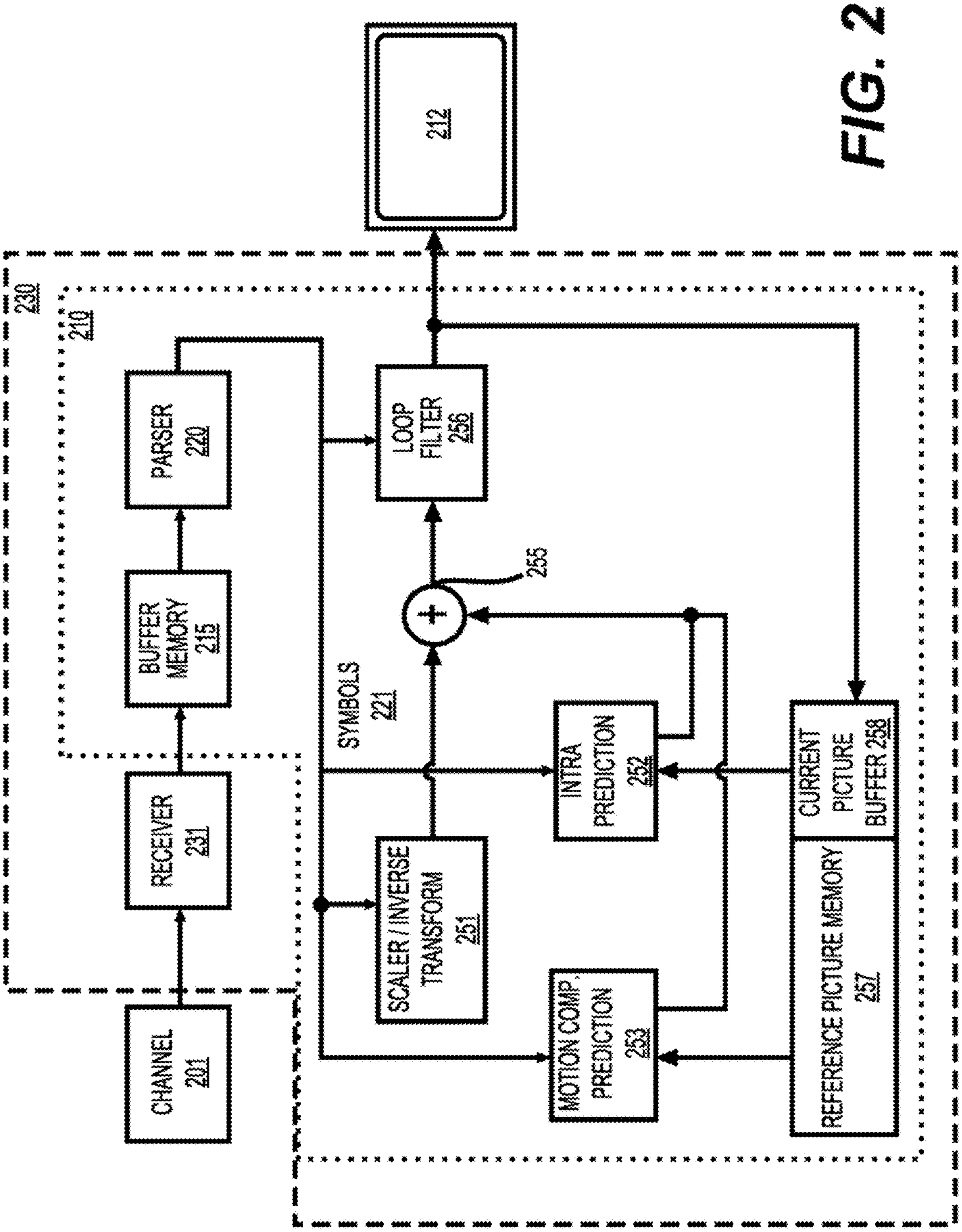
FIG. 2 is a schematic illustration of an example of a block diagram of a decoder.

FIG. 2 shows an example of a block diagram of a video decoder (210). The video decoder (210) can be included in an electronic device (230). The electronic device (230) can include a receiver (231) (e.g., receiving circuitry). The video decoder (210) can be used in the place of the video decoder (110) in the FIG. 1 example.

The receiver (231) may receive one or more coded video sequences, included in a bitstream for example, to be decoded by the video decoder (210). In an aspect, one coded video sequence is received at a time, where the decoding of each coded video sequence is independent from the decoding of other coded video sequences. The coded video sequence may be received from a channel (201), which may be a hardware/software link to a storage device which stores the encoded video data. The receiver (231) may receive the encoded video data with other data, for example, coded audio data and/or ancillary data streams, that may be forwarded to their respective using entities (not depicted). The receiver (231) may separate the coded video sequence from the other data. To combat network jitter, a buffer memory (215) may be coupled in between the receiver (231) and an entropy decoder/parser (220) ("parser (220)" henceforth). In certain applications, the buffer memory (215) is part of the video decoder (210). In others, it can be outside of the video decoder (210) (not depicted). In still others, there can be a buffer memory (not depicted) outside of the video decoder (210), for example to combat network jitter, and in addition another buffer memory (215) inside the video decoder (210), for example to handle playout timing. When the receiver (231) is receiving data from a store/forward device of sufficient bandwidth and controllability, or from an isosynchronous network, the buffer memory (215) may not be needed, or can be small. For use on best effort packet networks such as the Internet, the buffer memory (215) may be required, can be comparatively large and can be advantageously of adaptive size, and may at least partially be implemented in an operating system or similar elements (not depicted) outside of the video decoder (210).

The video decoder (210) may include the parser (220) to reconstruct symbols (221) from the coded video sequence. Categories of those symbols include information used to manage operation of the video decoder (210), and potentially information to control a rendering device such as a render device (212) (e.g., a display screen) that is not an integral part of the electronic device (230) but can be coupled to the electronic device (230), as shown in FIG. 2. The control information for the rendering device(s) may be in the form of Supplemental Enhancement Information (SEI) messages or Video Usability Information (VUI) parameter set fragments (not depicted). The parser (220) may parse/entropy-decode the coded video sequence that is received. The coding of the coded video sequence can be in accordance with a video coding technology or standard, and can follow various principles, including variable length coding, Huffman coding, arithmetic coding with or without context sensitivity, and so forth. The parser (220) may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The parser (220) may also extract from the coded video sequence information such as transform coefficients, quantizer parameter values, motion vectors, and so forth.

The parser (220) may perform an entropy decoding/parsing operation on the video sequence received from the buffer memory (215), so as to create symbols (221).

Reconstruction of the symbols (221) can involve multiple different units depending on the type of the coded video picture or parts thereof (such as: inter and intra picture, inter and intra block), and other factors. Which units are involved, and how, can be controlled by subgroup control information parsed from the coded video sequence by the parser (220). The flow of such subgroup control information between the parser (220) and the multiple units below is not depicted for clarity.

Beyond the functional blocks already mentioned, the video decoder (210) can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit (251). The scaler/inverse transform unit (251) receives a quantized transform coefficient as well as control information, including which transform to use, block size, quantization factor, quantization scaling matrices, etc. as symbol(s) (221) from the parser (220). The scaler/inverse transform unit (251) can output blocks comprising sample values, that can be input into aggregator (255).

In some cases, the output samples of the scaler/inverse transform unit (251) can pertain to an intra coded block. The intra coded block is a block that is not using predictive information from previously reconstructed pictures, but can use predictive information from previously reconstructed parts of the current picture. Such predictive information can be provided by an intra picture prediction unit (252). In some cases, the intra picture prediction unit (252) generates a block of the same size and shape of the block under reconstruction, using surrounding already reconstructed information fetched from the current picture buffer (258). The current picture buffer (258) buffers, for example, partly reconstructed current picture and/or fully reconstructed current picture. The aggregator (255), in some cases, adds, on a per sample basis, the prediction information the intra prediction unit (252) has generated to the output sample information as provided by the scaler/inverse transform unit (251).

In other cases, the output samples of the scaler/inverse transform unit (251) can pertain to an inter coded, and potentially motion compensated, block. In such a case, a motion compensation prediction unit (253) can access reference picture memory (257) to fetch samples used for prediction. After motion compensating the fetched samples in accordance with the symbols (221) pertaining to the block, these samples can be added by the aggregator (255) to the output of the scaler/inverse transform unit (251) (in this case called the residual samples or residual signal) so as to generate output sample information. The addresses within the reference picture memory (257) from where the motion compensation prediction unit (253) fetches prediction samples can be controlled by motion vectors, available to the motion compensation prediction unit (253) in the form of symbols (221) that can have, for example X, Y, and reference picture components. Motion compensation also can include interpolation of sample values as fetched from the reference picture memory (257) when sub-sample exact motion vectors are in use, motion vector prediction mechanisms, and so forth.

The output samples of the aggregator (255) can be subject to various loop filtering techniques in the loop filter unit (256). Video compression technologies can include in-loop filter technologies that are controlled by parameters included in the coded video sequence (also referred to as coded video bitstream) and made available to the loop filter unit (256) as symbols (221) from the parser (220). Video compression can also be responsive to meta-information obtained during the decoding of previous (in decoding order) parts of the coded picture or coded video sequence, as well as responsive to previously reconstructed and loop-filtered sample values.

The output of the loop filter unit (256) can be a sample stream that can be output to the render device (212) as well as stored in the reference picture memory (257) for use in future inter-picture prediction.

Certain coded pictures, once fully reconstructed, can be used as reference pictures for future prediction. For example, once a coded picture corresponding to a current picture is fully reconstructed and the coded picture has been identified as a reference picture (by, for example, the parser (220)), the current picture buffer (258) can become a part of the reference picture memory (257), and a fresh current picture buffer can be reallocated before commencing the reconstruction of the following coded picture.

The video decoder (210) may perform decoding operations according to a predetermined video compression technology or a standard, such as ITU-T Rec. H.265. The coded video sequence may conform to a syntax specified by the video compression technology or standard being used, in the sense that the coded video sequence adheres to both the syntax of the video compression technology or standard and the profiles as documented in the video compression technology or standard. Specifically, a profile can select certain tools as the only tools available for use under that profile from all the tools available in the video compression technology or standard. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an aspect, the receiver (231) may receive additional (redundant) data with the encoded video. The additional data may be included as part of the coded video sequence(s). The additional data may be used by the video decoder (210) to properly decode the data and/or to more accurately reconstruct the original video data. Additional data can be in the form of, for example, temporal, spatial, or signal noise ratio (SNR) enhancement layers, redundant slices, redundant pictures, forward error correction codes, and so on.

Figure 3:
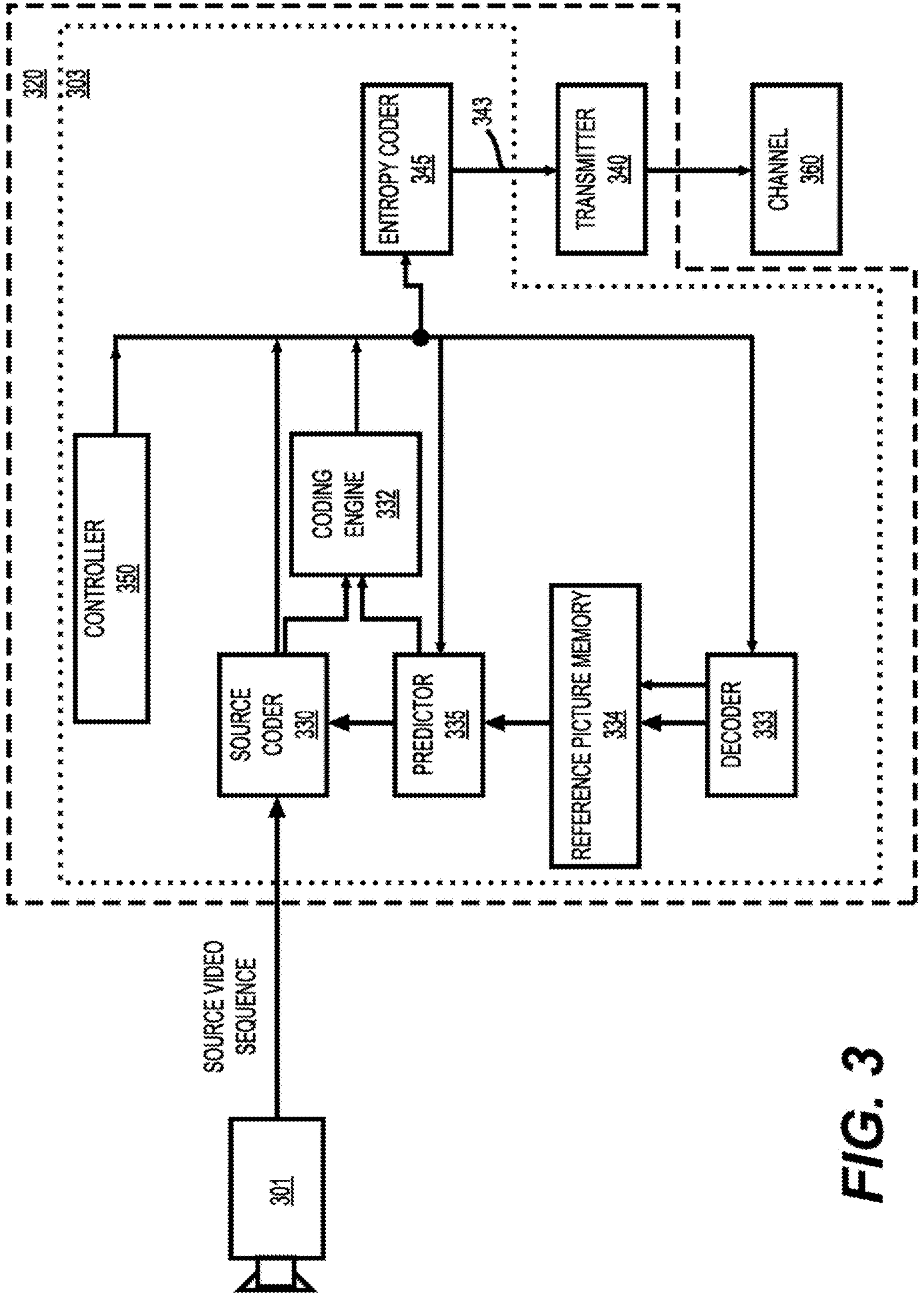
FIG. 3 is a schematic illustration of an example of a block diagram of an encoder.

FIG. 3 shows an example of a block diagram of a video encoder (303). The video encoder (303) is included in an electronic device (320). The electronic device (320) includes a transmitter (340) (e.g., transmitting circuitry). The video encoder (303) can be used in the place of the video encoder (103) in the FIG. 1 example.

The video encoder (303) may receive video samples from a video source (301) (that is not part of the electronic device (320) in the FIG. 3 example) that may capture video image(s) to be coded by the video encoder (303). In another example, the video source (301) is a part of the electronic device (320).

The video source (301) may provide the source video sequence to be coded by the video encoder (303) in the form of a digital video sample stream that can be of any suitable bit depth (for example: 8 bit, 10 bit, 12 bit, . . . ), any colorspace (for example, BT.601 Y CrCB, RGB, . . . ), and any suitable sampling structure (for example Y CrCb 4:2:0, Y CrCb 4:4:4). In a media serving system, the video source (301) may be a storage device storing previously prepared video. In a videoconferencing system, the video source (301) may be a camera that captures local image information as a video sequence. Video data may be provided as a plurality of individual pictures that impart motion when viewed in sequence. The pictures themselves may be organized as a spatial array of pixels, wherein each pixel can comprise one or more samples depending on the sampling structure, color space, etc. in use. The description below focuses on samples.

According to an aspect, the video encoder (303) may code and compress the pictures of the source video sequence into a coded video sequence (343) in real time or under any other time constraints as required. Enforcing appropriate coding speed is one function of a controller (350). In some aspects, the controller (350) controls other functional units as described below and is functionally coupled to the other functional units. The coupling is not depicted for clarity. Parameters set by the controller (350) can include rate control related parameters (picture skip, quantizer, lambda value of rate-distortion optimization techniques, . . . ), picture size, group of pictures (GOP) layout, maximum motion vector search range, and so forth. The controller (350) can be configured to have other suitable functions that pertain to the video encoder (303) optimized for a certain system design.

In some aspects, the video encoder (303) is configured to operate in a coding loop. As an oversimplified description, in an example, the coding loop can include a source coder (330) (e.g., responsible for creating symbols, such as a symbol stream, based on an input picture to be coded, and a reference picture(s)), and a (local) decoder (333) embedded in the video encoder (303). The decoder (333) reconstructs the symbols to create the sample data in a similar manner as a (remote) decoder also would create. The reconstructed sample stream (sample data) is input to the reference picture memory (334). As the decoding of a symbol stream leads to bit-exact results independent of decoder location (local or remote), the content in the reference picture memory (334) is also bit exact between the local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is used in some related arts as well.

The operation of the "local" decoder (333) can be the same as a "remote" decoder, such as the video decoder (210), which has already been described in detail above in conjunction with FIG. 2. Briefly referring also to FIG. 2, however, as symbols are available and encoding/decoding of symbols to a coded video sequence by an entropy coder (345) and the parser (220) can be lossless, the entropy decoding parts of the video decoder (210), including the buffer memory (215), and parser (220) may not be fully implemented in the local decoder (333).

In an aspect, a decoder technology except the parsing/entropy decoding that is present in a decoder is present, in an identical or a substantially identical functional form, in a corresponding encoder. Accordingly, the disclosed subject matter focuses on decoder operation. The description of encoder technologies can be abbreviated as they are the inverse of the comprehensively described decoder technologies. In certain areas a more detail description is provided below.

During operation, in some examples, the source coder (330) may perform motion compensated predictive coding, which codes an input picture predictively with reference to one or more previously coded picture from the video sequence that were designated as "reference pictures." In this manner, the coding engine (332) codes differences between pixel blocks of an input picture and pixel blocks of reference picture(s) that may be selected as prediction reference(s) to the input picture.

The local video decoder (333) may decode coded video data of pictures that may be designated as reference pictures, based on symbols created by the source coder (330). Operations of the coding engine (332) may advantageously be lossy processes. When the coded video data may be decoded at a video decoder (not shown in FIG. 3), the reconstructed video sequence typically may be a replica of the source video sequence with some errors. The local video decoder (333) replicates decoding processes that may be performed by the video decoder on reference pictures and may cause reconstructed reference pictures to be stored in the reference picture memory (334). In this manner, the video encoder (303) may store copies of reconstructed reference pictures locally that have common content as the reconstructed reference pictures that will be obtained by a far-end video decoder (absent transmission errors).

The predictor (335) may perform prediction searches for the coding engine (332). That is, for a new picture to be coded, the predictor (335) may search the reference picture memory (334) for sample data (as candidate reference pixel blocks) or certain metadata such as reference picture motion vectors, block shapes, and so on, that may serve as an appropriate prediction reference for the new pictures. The predictor (335) may operate on a sample block-by-pixel block basis to find appropriate prediction references. In some cases, as determined by search results obtained by the predictor (335), an input picture may have prediction references drawn from multiple reference pictures stored in the reference picture memory (334).

The controller (350) may manage coding operations of the source coder (330), including, for example, setting of parameters and subgroup parameters used for encoding the video data.

Output of all aforementioned functional units may be subjected to entropy coding in the entropy coder (345). The entropy coder (345) translates the symbols as generated by the various functional units into a coded video sequence, by applying lossless compression to the symbols according to technologies such as Huffman coding, variable length coding, arithmetic coding, and so forth.

The transmitter (340) may buffer the coded video sequence(s) as created by the entropy coder (345) to prepare for transmission via a communication channel (360), which may be a hardware/software link to a storage device which would store the encoded video data. The transmitter (340) may merge coded video data from the video encoder (303) with other data to be transmitted, for example, coded audio data and/or ancillary data streams (sources not shown).

The controller (350) may manage operation of the video encoder (303). During coding, the controller (350) may assign to each coded picture a certain coded picture type, which may affect the coding techniques that may be applied to the respective picture. For example, pictures often may be assigned as one of the following picture types:

An Intra Picture (I picture) may be coded and decoded without using any other picture in the sequence as a source of prediction. Some video codecs allow for different types of intra pictures, including, for example Independent Decoder Refresh ("IDR") Pictures.

A predictive picture (P picture) may be coded and decoded using intra prediction or inter prediction using a motion vector and reference index to predict the sample values of each block.

A bi-directionally predictive picture (B Picture) may be coded and decoded using intra prediction or inter prediction using two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded predictively, via spatial prediction or via temporal prediction with reference to one previously coded reference picture. Blocks of B pictures may be coded predictively, via spatial prediction or via temporal prediction with reference to one or two previously coded reference pictures.

The video encoder (303) may perform coding operations according to a predetermined video coding technology or standard, such as ITU-T Rec. H.265. In its operation, the video encoder (303) may perform various compression operations, including predictive coding operations that exploit temporal and spatial redundancies in the input video sequence. The coded video data, therefore, may conform to a syntax specified by the video coding technology or standard being used.

In an aspect, the transmitter (340) may transmit additional data with the encoded video. The source coder (330) may include such data as part of the coded video sequence. Additional data may comprise temporal/spatial/SNR enhancement layers, other forms of redundant data such as redundant pictures and slices, SEI messages, VUI parameter set fragments, and so on.

A video may be captured as a plurality of source pictures (video pictures) in a temporal sequence. Intra-picture prediction (often abbreviated to intra prediction) makes use of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

In some aspects, a bi-prediction technique can be used in the inter-picture prediction. According to the bi-prediction technique, two reference pictures, such as a first reference picture and a second reference picture that are both prior in decoding order to the current picture in the video (but may be in the past and future, respectively, in display order) are used. A block in the current picture can be coded by a first motion vector that points to a first reference block in the first reference picture, and a second motion vector that points to a second reference block in the second reference picture. The block can be predicted by a combination of the first reference block and the second reference block.

Further, a merge mode technique can be used in the inter-picture prediction to improve coding efficiency.

According to some aspects of the disclosure, predictions, such as inter-picture predictions and intra-picture predictions, are performed in the unit of blocks. For example, according to the HEVC standard, a picture in a sequence of video pictures is partitioned into coding tree units (CTU) for compression, the CTUs in a picture have the same size, such as 64×64 pixels, 32×32 pixels, or 16×16 pixels. In general, a CTU includes three coding tree blocks (CTBs), which are one luma CTB and two chroma CTBs. Each CTU can be recursively quadtree split into one or multiple coding units (CUs). For example, a CTU of 64×64 pixels can be split into one CU of 64×64 pixels, or 4 CUs of 32×32 pixels, or 16 CUs of 16×16 pixels. In an example, each CU is analyzed to determine a prediction type for the CU, such as an inter prediction type or an intra prediction type. The CU is split into one or more prediction units (PUs) depending on the temporal and/or spatial predictability. Generally, each PU includes a luma prediction block (PB), and two chroma PBs. In an aspect, a prediction operation in coding (encoding/decoding) is performed in the unit of a prediction block. Using a luma prediction block as an example of a prediction block, the prediction block includes a matrix of values (e.g., luma values) for pixels, such as 8×8 pixels, 16×16 pixels, 8×16 pixels, 16×8 pixels, and the like.

It is noted that the video encoders (103) and (303), and the video decoders (110) and (210) can be implemented using any suitable technique. In an aspect, the video encoders (103) and (303) and the video decoders (110) and (210) can be implemented using one or more integrated circuits. In another aspect, the video encoders (103) and (303), and the video decoders (110) and (210) can be implemented using one or more processors that execute software instructions.

Aspects of the disclosure include techniques for improving a fusion process, such as by using blending masks instead of fixed weights.

Figure 4:
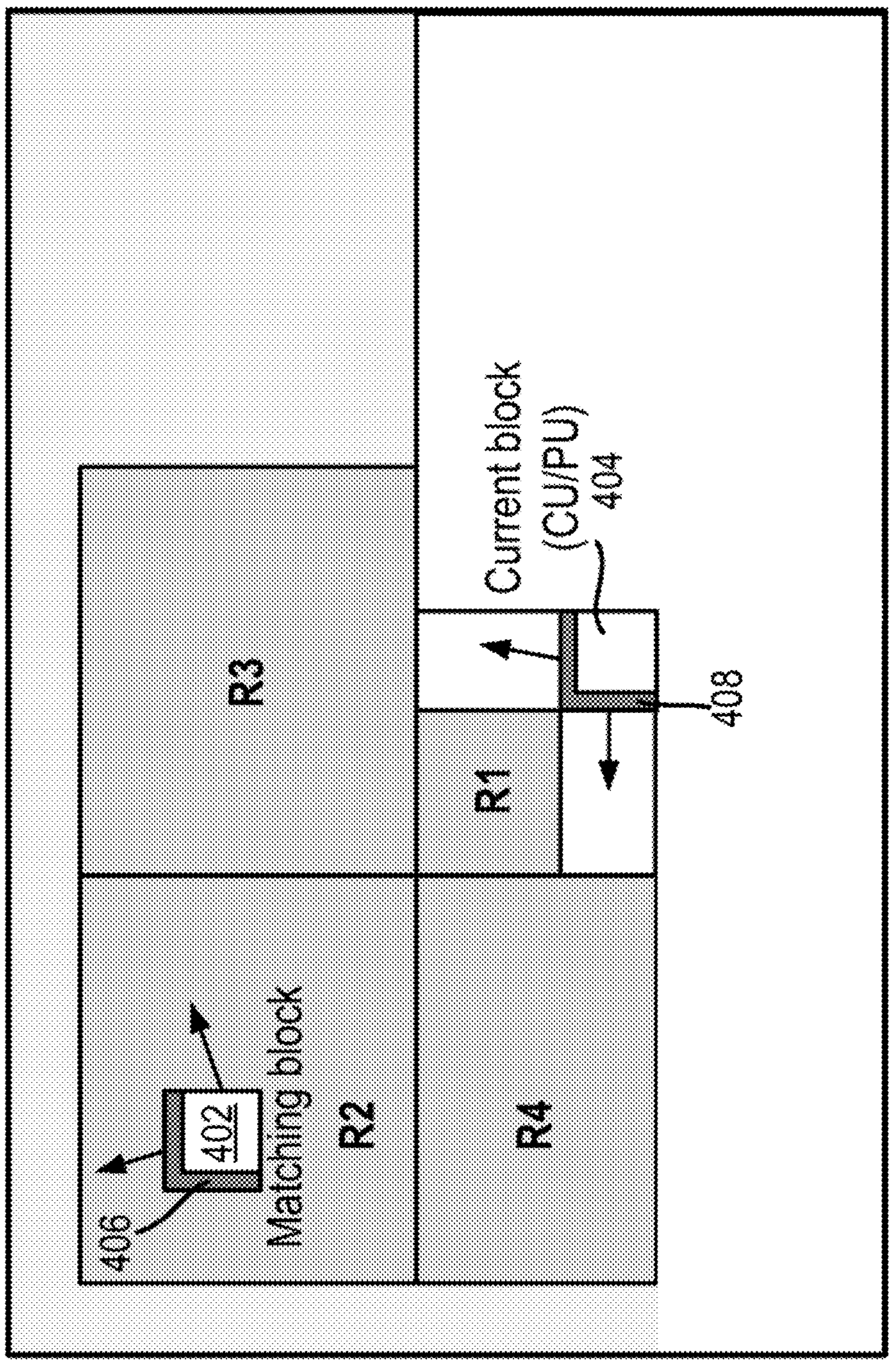
FIG. 4 is an example of an intra template matching prediction (IntraTMP) according to some aspects of the disclosure.

Intra template matching prediction (also referred to as intraTMP) is, for example, a special intra prediction mode that copies a best prediction block from the reconstructed part of the current frame, whose L-shaped template matches the current template (e.g., a template of a current block). For a predefined search range, the encoder may search for a most similar template to the current template in a reconstructed part of the current frame and use the corresponding block as a prediction block, where the most similar template is associated with the corresponding block and the current template is associated with the current block. The encoder then signals the usage of the intraTMP mode, and the same prediction operation can be performed at a decoder side. An example of a matching block (or corresponding block) (402) is illustrated in FIG. 4. The matching block (402) may act as the matching area for a current CU (404).

As shown in FIG. 4, the prediction signal may be generated by matching the L-shaped causal neighbors (or L-shaped template) of the current block (404) with another block in a predefined search area. An example predefined search area may include R1 (a current CTU), R2 (a top-left CTU), R3 (an above CTU), and R4 (a left CTU).

In an aspect, a sum of absolute differences (SAD) is used as a cost function in IntraTMP mode. Within each search area, the decoder can search for a template (406) of a block (402) that has a least SAD with respect to the current template (408) of the current block (404) and use the block with the least SAD as a corresponding block of the current block. The corresponding block may further act as a prediction block for the current block (404).

Dimensions of all search regions (e.g., SearchRange_w, SearchRange_h) may be set to be proportional to a block dimension (e.g., BlkW, BlkH) of the current block. Accordingly, a fixed number of SAD comparisons may be obtained in each pixel. For example, the dimensions of a search region (or search range) may be defined in Equations 1 and 2 as follows:

$$\text{SearchRange\_w} = a * BlkW \quad \text{Eq. (1)}$$

$$\text{SearchRange\_h} = a * BlkH \quad \text{Eq. (2)}$$

where "a" is a constant that controls a trade-off between a gain and a complexity of the search process. In an example, "a" is equal to 5.

In an aspect, to speed-up the template matching process, the search range of all search regions may subsampled by a factor of 2. The reduced search range may lead to a reduction of template matching search by 4. After a best match is found, a refinement process may be further performed. The refinement may be performed via a second template matching search around the best match with a reduced range. The reduced range may be defined as min(BlkW, BlkH)/2.

The Intra template matching tool may be enabled for CUs with a size less than or equal to 64 in a width and a height. A maximum CU size for Intra template matching may be configurable.

In an aspect, the intra template matching prediction mode may signaled at a CU level through a dedicated flag when decoder-side intra mode derivation (DIMD) is not used for a current CU.

In an aspect, such as in JVET-AC0068, a multi-candidate intraTMP method constructs a candidate list and BVs (or block vectors) of candidate blocks (e.g., BVs that point to reference blocks). The candidate list may be ranked in an ascending order of template matching costs associated with the candidate blocks. An index may be signaled in a bitstream to indicate which candidate BV is used for a current block.

In an aspect, such as in JVET-AC0069, a method derives multiple intraTMP blocks and then fuses the intraTMP blocks to generate an overall predictor. The method may be beneficial for camera captured content. An example intraTMP fusion algorithm may include aspects as follows:

In an example, multiple blocks may be determined during an intraTMP search. For example, in a subsampled intraTMP search process, a candidate list may be initially generated to include a number of matched blocks (e.g., 30 matched blocks) having smallest template costs (e.g., sum of absolute differences (SADs)). For each block, a full pixel refinement search may be performed within a small region. A sampling factor of the subsampled search process may be 3 and a refinement region may be 3×3 around each of the 30 matched blocks. Then the best (or selected) 3 candidate blocks defined by a template SAD across all refinement regions of the 30 matched blocks are selected.

In an example, select candidate blocks may be used for fusion. For each of the best 3 candidate blocks, a threshold may be used to judge whether the selected candidate block is used for fusion. The threshold may be defined according to equation (3) as follows:

$$\text{Threshold} = SAD_1 << 1 \quad \text{Eq. (3)}$$

where $SAD_1$ is a smallest template SAD of the three selected candidate blocks. Candidate blocks with SAD<=Threshold may be used for fusion. Therefore, a number of candidates blocks may be determined for fusion.

In an example, weights for each block used for fusion may be calculated. Once blocks to be fused are decided, the blocks may be fused with respective weights. To determine fusion weights, two methods may be tested (or applied). In a first method, fusion weights may be calculated by SADs of the fusion weights. The weights may be calculated as follows in equations (4) and (5):

$$\text{sum} = \sum_{i=1}^{n} SAD_i \quad \text{Eq. (4)}$$

$$w_i = \frac{\text{sum} - SAD_i}{(n-1) * \text{sum}} \quad \text{Eq. (5)}$$

To reduce an implementation cost, division operations shown in equations (4) and (5) may be replaced by an integer look-up table (LUT). In a second method, fixed weights may be used to further reduce complexity of the first method. The weights may be set as $$\{w_1, w_2\} = \left\{\frac{1}{2}, \frac{1}{2}\right\} \text{ or } \{w_1, w_2, w_3\} = \left\{\frac{22}{64}, \frac{21}{64}, \frac{21}{64}\right\}$$

In an example, a final fused predictor may be determined by equation (6) as follows:

$$p_{fusion} = \sum_{i=1}^{n} w_i p_i \quad \text{Eq. (6)}$$

where $p_i$ is a $i^{th}$ block, and n is a number of blocks selected for fusion. When only one block remains after the selection step according to equation (3), the final predictor may be calculated by equation (7) as follows:

$$p_{fusion} = w_1 p_{TMP} + w_2 p_{intra} \quad \text{Eq. (7)}$$

where $p_{TMP}$ is a single block and $p_{intra}$ is an intra predictor derived by a planar mode. In an example, weights in equation (7) may be set as $w_1=7/8$ and $w_2=1/8$.

In an aspect, a CU level flag may be signaled to indicate whether an intraTMP CU is predicted by related fusion methods or an original method (e.g., a non-fusion method). In an example, the fusion method with an enlarged search range may also be tested. A modified search range may be described as follows in equations (8) and (9)

$$SearchRangeWidth = \max(a * BlkWidth, minSearchRange) \quad \text{Eq. (8)}$$

$$SearchRangeHeight = \max(a * BlkHeight, minSearchRange) \quad \text{Eq. (9)}$$

where minSearchRange may be set as 128 in a subsequent test.

As described above, a related fusion process, such as in JVET-AC0068, may use fixed weights. The fixed weights may be derived from SAD costs that are calculated using an entire template for all samples in a block. The fusion process may be ideal (or suitable) because different regions in the current block may prefer (or need) different IntraTMP candidate blocks as a reference. In the disclosure, blending masks instead of fixed weights may be applied in the fusion process such that different regions in a block may use different intraTMP candidate blocks.

In the disclosure, a blending mask may be applied for fusing selected candidate blocks. The blending mask may include one or more weighting factors for samples in a candidate block.

In an aspect, a final predictor may be determined based on the selected candidate blocks and corresponding masks. For example, the final predictor may be determined by equation (10) as follows:

$$p_{fusion} = \sum_{i=1}^{n} M_i p_i \quad \text{Eq. (10)}$$

where $p_i$ is a $i^{th}$ candidate block, and n is a number of candidate blocks selected for fusion. $M_i$ is a mask (or blending mask) used for the $i^{th}$ candidate block. In an example, $M_i$ may have a same dimension as a dimension of the $i^{th}$ block. For example, $M_i$ may have a same height and a same width as the $i^{th}$ block. In an aspect, when only one block remains after a selection step, such as the selection step according to equation (3), a final predictor may be calculated in equation (11) as follows:

$$p_{fusion} = M_1 p_{TMP} + M_1' p_{intra} \quad \text{Eq. (11)}$$

where $p_{TMP}$ may be a single block (or the only block that is selected) and $p_{intra}$ may be an intra predictor derived by an intra prediction mode, such as a planar mode. In an example, the mask $M'_1$ may be a complement of mask $M_1$. For example, a value in a position of M1 and a value in a collocated position of M' is a constant value.

In an aspect, the blending mask may be a matrix of a size [W, H], where W and H may correspond to a width and a height of a current block respectively. Values in the matrix correspond to weighting factors used for each sample position in a candidate predictor. For each element (w, h) in the mask, a value $M_i$ (w, h), may be different.

In an aspect, a set of blending masks may be pre-defined, and an appropriate mask may be chosen from the set of blending masks. The set of blending masks may be chosen based on a statistical measure between a current block template and a candidate predictor template. In an example, each candidate blending mask may be applied to the template of the current block and the template of the candidate predictor. A corresponding cost value may be calculated, and a candidate blending mask that corresponds to a minimum cost may be defined as the selected mask.

In an aspect, a current block and an associated template of the current block may be partitioned into different regions and an appropriate mask may be chosen (or selected). The appropriate mask may be chosen based on a statistical measure between the partitioned current block template and the candidate predictor template partitioned in a similar manner. In an example, the appropriate (or selected) mask may be a weighting matrix. In an example, the selected mask may also have different regions corresponding to the partitioned regions of the current block and the partitioned region of the associated template of the current block.

In an example, the statistical measure may include, but is not limited to SAD, a sum of absolute transformed difference (SATD), Haar Discrete Transform (HAD), a sum of squared errors (SSE), a mean absolute difference (MSE), or the like.

In an aspect, when a blending mask is used for fusing selected candidate blocks, an additional filtering, such as a low-pass filtering, may be applied on $p_{fusion}$.

In an aspect, a flag (or a first flag), such as a CU level flag, may be signaled to indicate whether an IntraTMP CU (or a CU coded by IntraTMP) is predicted using the blending mask based fusion method, for example as described in equations (10) and (11), or is predicted without a blending mask, such as when using an original method according to the IntraTMP. The original method of the IntraTMP may be shown in FIG. 4 in which the blending mask based fusion method is not applied.

In an aspect, if the IntraTMP CU is predicted by the blending mask based fusion method, another flag (or second flag) may be signaled to indicate whether additional filtering is applied or not. For example, the other flag may indicate whether a filter is to be applied to $p_{fusion}$.

Figure 5:
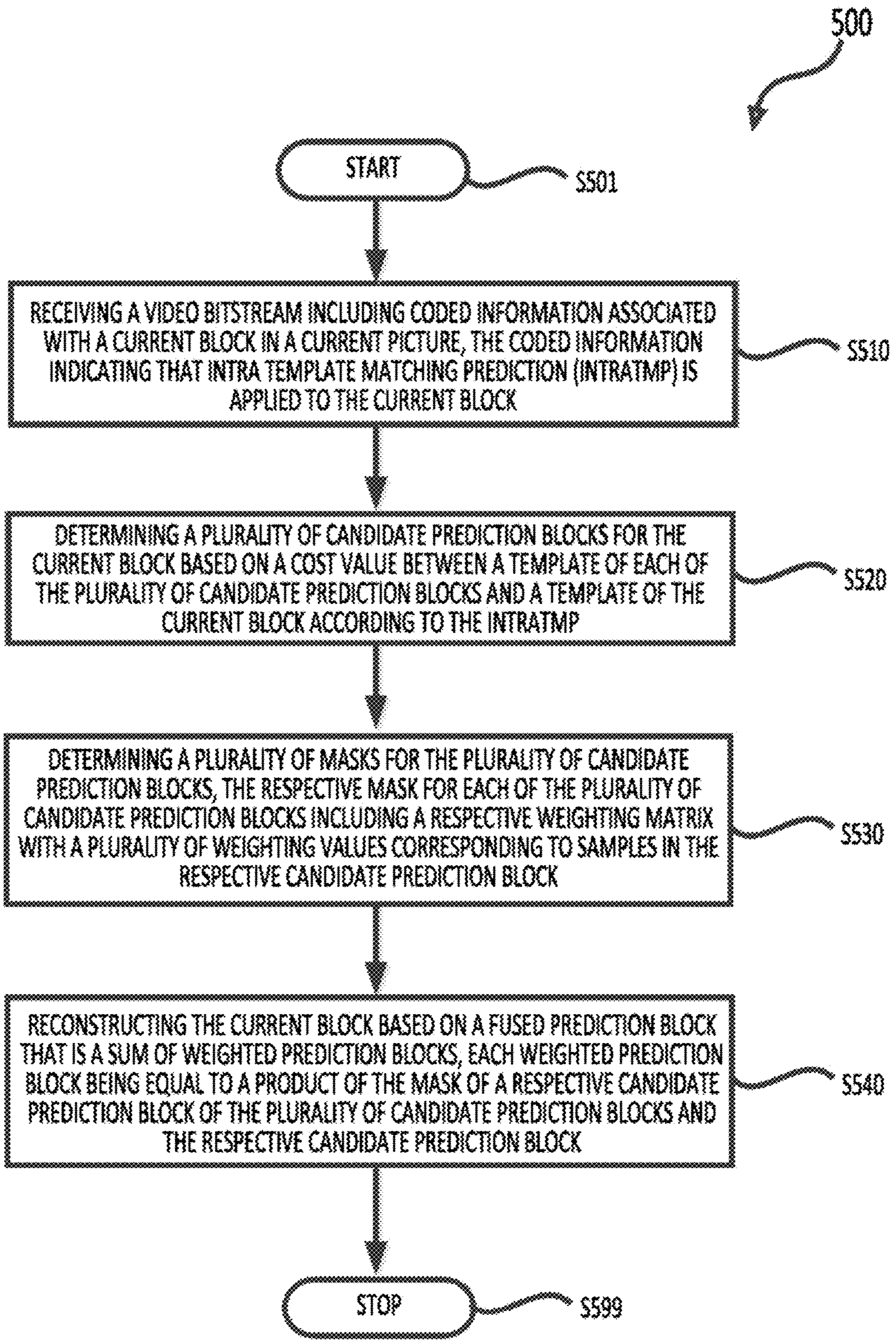
FIG. 5 shows a flow chart outlining a decoding process according to some aspects of the disclosure.

FIG. 5 shows a flow chart outlining a process (500) according to an aspect of the disclosure. The process (500) can be used in a video decoder. In various aspects, the process (500) is executed by processing circuitry, such as the processing circuitry that performs functions of the video decoder (110), the processing circuitry that performs functions of the video decoder (210), and the like. In some aspects, the process (500) is implemented in software instructions, thus when the processing circuitry executes the software instructions, the processing circuitry performs the process (500). The process starts at (S501) and proceeds to (S510).

At (S510), a video bitstream including coded information associated with a current block in a current picture is received. The coded information indicates that intraTMP is applied to the current block.

At (S520), a plurality of candidate prediction blocks is determined for the current block based on a cost value between a template of each of the plurality of candidate prediction blocks and a template of the current block according to the intraTMP.

At (S530), a plurality of masks is determined for the plurality of candidate prediction blocks. The respective mask for each of the plurality of candidate prediction blocks includes a respective weighting matrix with a plurality of weighting values corresponding to samples in the respective candidate prediction block.

At (S540), the current block is reconstructed based on a fused prediction block that is a sum of weighted prediction blocks. Each weighted prediction block is equal to a product of the mask of a respective candidate prediction block of the plurality of candidate prediction blocks and the respective candidate prediction block.

In an example, the mask of the respective candidate prediction block has a matrix dimension that is equal to a dimension of the respective candidate prediction block. Each of the plurality of weighting values in the mask of the respective candidate prediction block corresponds to a respective sample of the samples in the respective candidate prediction block.

In an example, one or more candidate prediction blocks are selected from the plurality of candidate prediction blocks when the cost values of the one or more candidate prediction blocks are equal to or less than a threshold value. The weighted prediction blocks are determined based on the selected one or more candidate prediction blocks. The fused prediction block is determined based on the sum of the weighted prediction blocks.

In an example, when one of the plurality of candidate prediction blocks is selected, the fused prediction block is determined as a sum of a first weighted prediction block and a second weighted prediction block. The first weighted prediction block is equal to a product of the selected one of the plurality of candidate prediction blocks and a first mask of the plurality of masks. The second weighted prediction block is equal to a product of an intra predictor derived by a planar mode and a second mask of the plurality of masks.

In an example, a sum of a weighting value in a position of the first mask and a weighting value in a collocated position of the second mask is a constant value.

In an example, a plurality of candidate masks is determined for a first candidate prediction block of the plurality of candidate prediction blocks. Each of the plurality of candidate masks is applied to the template of the current block and the template of the first candidate prediction block to obtain a plurality of cost values. The mask for the first candidate prediction block is determined from the plurality of candidate masks that corresponds to a minimum cost value of the cost values.

In an example, samples in the sum of the weighted prediction blocks are filtered based on a filter. The fused prediction block is determined based on the filtered samples in the sum of the weighted prediction blocks.

In an example, the coded information further includes a first flag that indicates whether the current block is predicted using the fused prediction block. When the first flag indicates that the current block is predicted using the fused prediction block, the fused prediction block is determined based on the sum of the weighted prediction blocks.

In an example, the coded information further includes a second flag that indicates whether the samples in the sum of the weighted prediction blocks are to be filtered by a filter. When the second flag indicates that the samples in the sum of the weighted prediction blocks are to be filtered by the filter, the samples in the sum of the weighted prediction blocks are filtered based on the filter and the fused prediction block is determined based the filtered samples in the sum of the weighted prediction blocks.

Then, the process proceeds to (S599) and terminates.

The process (500) can be suitably adapted. Step(s) in the process (500) can be modified and/or omitted. Additional step(s) can be added. Any suitable order of implementation can be used.

Figure 6:
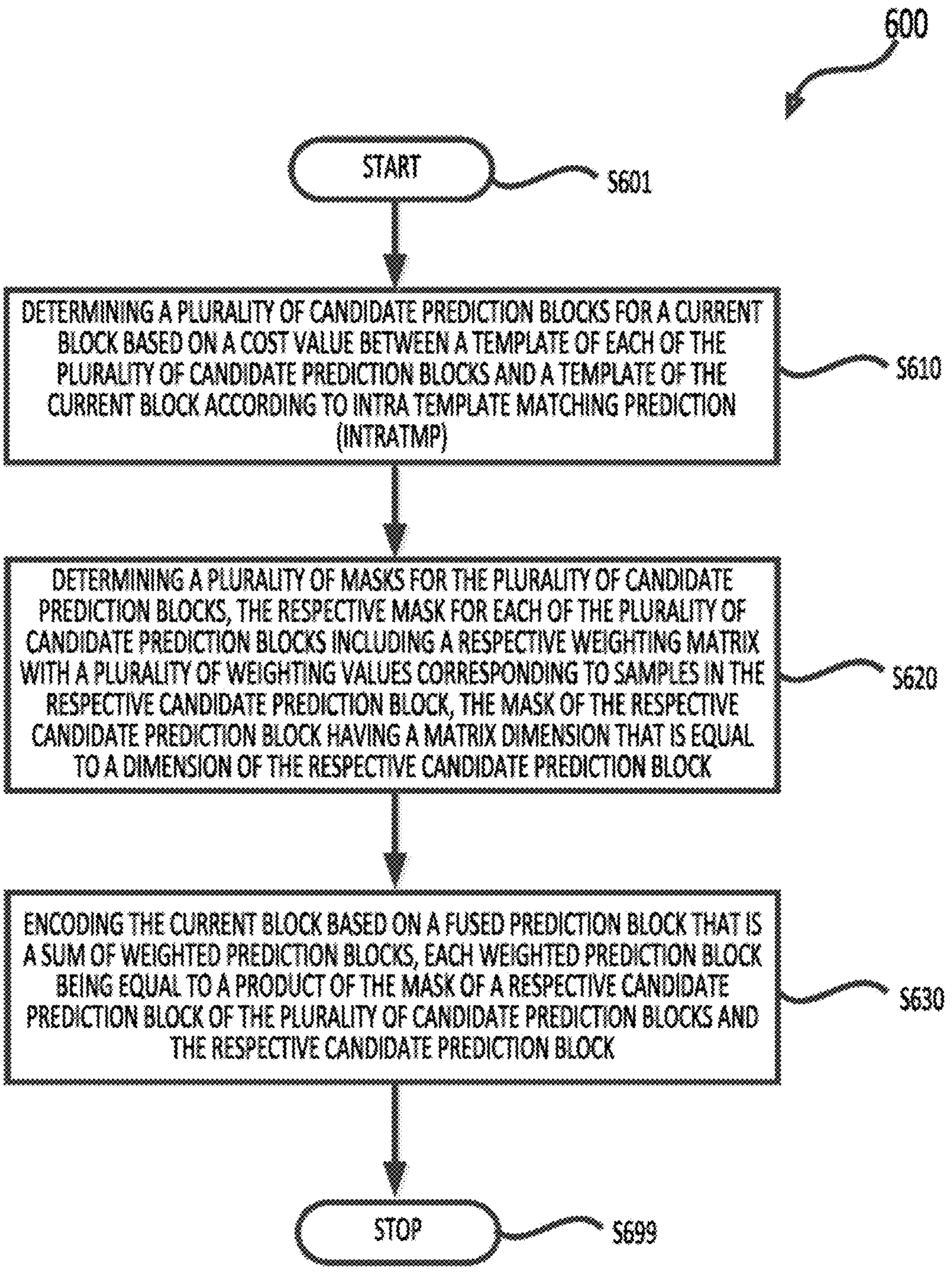
FIG. 6 shows a flow chart outlining an encoding process according to some aspects of the disclosure.

FIG. 6 shows a flow chart outlining a process (600) according to an aspect of the disclosure. The process (600) can be used in a video encoder. In various aspects, the process (600) is executed by processing circuitry, such as the processing circuitry that performs functions of the video encoder (103), the processing circuitry that performs functions of the video encoder (303), and the like. In some aspects, the process (600) is implemented in software instructions, thus when the processing circuitry executes the software instructions, the processing circuitry performs the process (600). The process starts at (S601) and proceeds to (S610).

At (S610), a plurality of candidate prediction blocks is determined for a current block based on a cost value between a template of each of the plurality of candidate prediction blocks and a template of the current block according to intra template matching prediction (intraTMP).

At (S620), a plurality of masks is determined for the plurality of candidate prediction blocks. The respective mask for each of the plurality of candidate prediction blocks includes a respective weighting matrix with a plurality of weighting values corresponding to samples in the respective candidate prediction block. The mask of the respective candidate prediction block has a matrix dimension that is equal to a dimension of the respective candidate prediction block.

At (S630), the current block is encoded based on a fused prediction block that is a sum of weighted prediction blocks. Each weighted prediction block is equal to a product of the mask of a respective candidate prediction block of the plurality of candidate prediction blocks and the respective candidate prediction block.

In an example, one or more candidate prediction blocks are selected from the plurality of candidate prediction blocks when the cost values of the one or more candidate prediction blocks are equal to or less than a threshold value. The weighted prediction blocks are determined based on the selected one or more candidate prediction blocks. The fused prediction block is determined based on the sum of the weighted prediction blocks.

In an example, when one of the plurality of candidate prediction blocks is selected, the fused prediction block is determined as a sum of a first weighted prediction block and a second weighted prediction block. The first weighted prediction block is equal to a product of the selected one of the plurality of candidate prediction blocks and a first mask of the plurality of masks. The second weighted prediction block is equal to a product of an intra predictor derived by a planar mode and a second mask of the plurality of masks.

In an example, a sum of a weighting value in a position of the first mask and a weighting value in a collocated position of the second mask is a constant value.

In an example, a plurality of candidate masks is determined for a first candidate prediction block of the plurality of candidate prediction blocks. Each of the plurality of candidate masks is applied to the template of the current block and the template of the first candidate prediction block to obtain a plurality of cost values. The mask for the first candidate prediction block is determined from the plurality of candidate masks that corresponds to a minimum cost value of the cost values.

Then, the process proceeds to (S699) and terminates.

The process (600) can be suitably adapted. Step(s) in the process (600) can be modified and/or omitted. Additional step(s) can be added. Any suitable order of implementation can be used.

Figure 7:
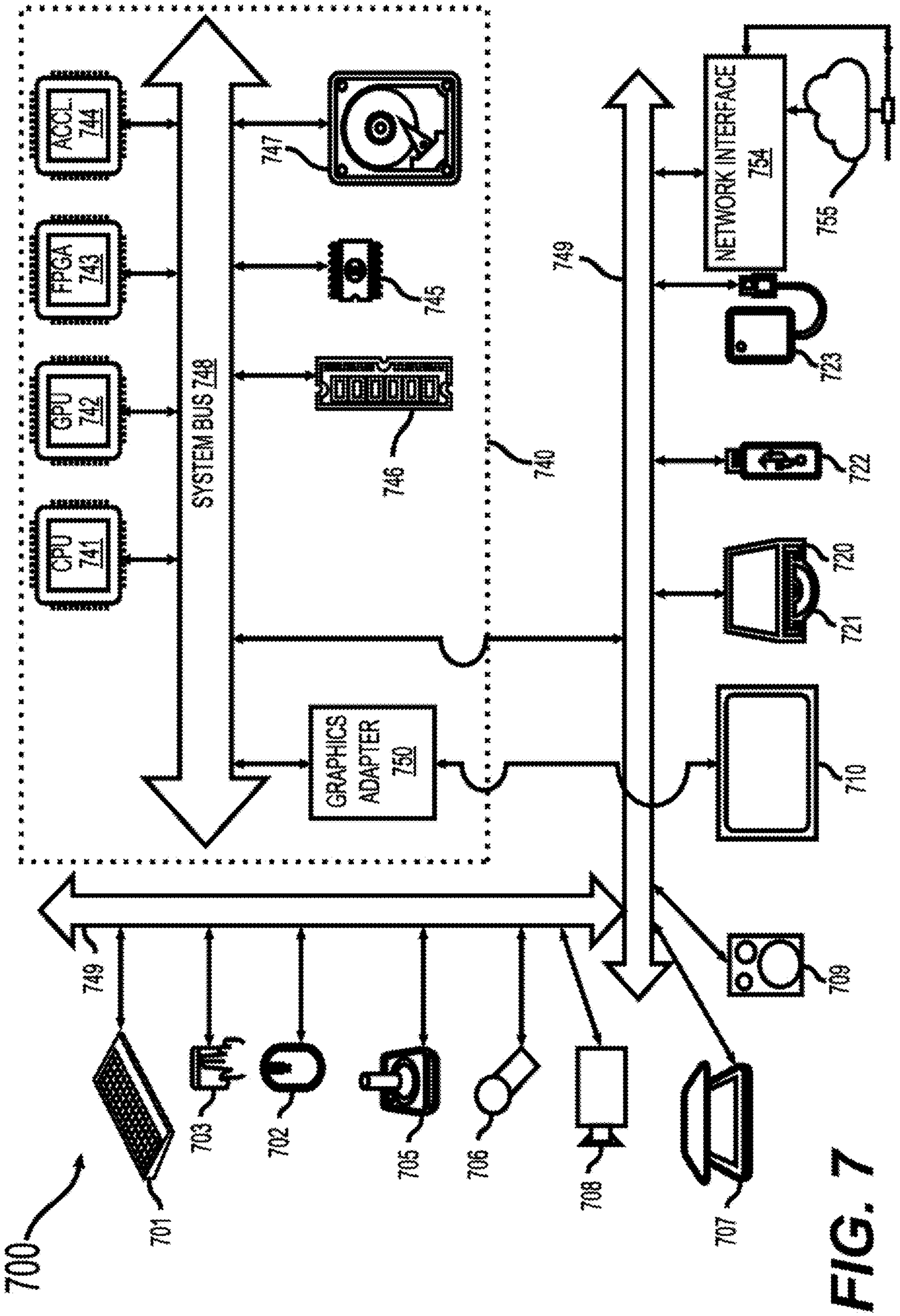
FIG. 7 is a schematic illustration of a computer system in accordance with an aspect.

The techniques described above, can be implemented as computer software using computer-readable instructions and physically stored in one or more computer-readable media. For example, FIG. 7 shows a computer system (700) suitable for implementing certain aspects of the disclosed subject matter.

According to an aspect of the disclosure, a method of processing visual media data is provided. In the method, a conversion between a visual media file and a bitstream of visual media data is performed according to a format rule. For example, the bitstream may be the bitstream used in any of the decoding/encoding methods. The format rule may specify one or more constraints of the bitstream and/or one or more processes to be performed by the decoder and/or encoder.

In an example, the bitstream includes coded information indicating that intra template matching prediction (intraTMP) is applied to a current block in a current picture. The format rule specifies that a plurality of candidate prediction blocks is determined for the current block based on a cost value between a template of each of the plurality of candidate prediction blocks and a template of the current block according to intraTMP. The format rule specifies that a plurality of masks is determined for the plurality of candidate prediction blocks. The respective mask for each of the plurality of candidate prediction blocks includes a respective weighting matrix with a plurality of weighting values corresponding to samples in the respective candidate prediction block. The format rule specifies that a fused prediction block is a sum of weighted prediction blocks. The respective weighted prediction block is equal to a product of the mask of the respective candidate prediction block and the respective candidate prediction block. The format rule specifies that the current block is processed based on the fused prediction block.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

The components shown in FIG. 7 for computer system (700) are examples and are not intended to suggest any limitation as to the scope of use or functionality of the computer software implementing aspects of the present disclosure. Neither should the configuration of components be interpreted as having any dependency or requirement relating to any one or combination of components illustrated in the example aspect of computer system (700).

Computer system (700) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (701), mouse (702), trackpad (703), touch screen (710), data-glove (not shown), joystick (705), microphone (706), scanner (707), camera (708).

Computer system (700) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (710), data-glove (not shown), or joystick (705), but there can also be tactile feedback devices that do not serve as input devices), audio output devices (such as: speakers (709), headphones (not depicted)), visual output devices (such as screens (710) to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system (700) can also include human accessible storage devices and their associated media such as optical media including CD/DVD ROM/RW (720) with CD/DVD or the like media (721), thumb-drive (722), removable hard drive or solid state drive (723), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (700) can also include an interface (754) to one or more communication networks (755). Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (749) (such as, for example USB ports of the computer system (700)); others are commonly integrated into the core of the computer system (700) by attachment to a system bus as described below (for example Ethernet interface into a PC computer system or cellular network interface into a smartphone computer system). Using any of these networks, computer system (700) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (740) of the computer system (700).

The core (740) can include one or more Central Processing Units (CPU) (741), Graphics Processing Units (GPU) (742), specialized programmable processing units in the form of Field Programmable Gate Areas (FPGA) (743), hardware accelerators for certain tasks (744), graphics adapters (750), and so forth. These devices, along with Read-only memory (ROM) (745), Random-access memory (746), internal mass storage such as internal non-user accessible hard drives, SSDs, and the like (747), may be connected through a system bus (748). In some computer systems, the system bus (748) can be accessible in the form of one or more physical plugs to enable extensions by additional CPUs, GPU, and the like. The peripheral devices can be attached either directly to the core's system bus (748), or through a peripheral bus (749). In an example, the screen (710) can be connected to the graphics adapter (750). Architectures for a peripheral bus include PCI, USB, and the like.

CPUs (741), GPUs (742), FPGAs (743), and accelerators (744) can execute certain instructions that, in combination, can make up the aforementioned computer code. That computer code can be stored in ROM (745) or RAM (746). Transitional data can also be stored in RAM (746), whereas permanent data can be stored for example, in the internal mass storage (747). Fast storage and retrieve to any of the memory devices can be enabled through the use of cache memory, that can be closely associated with one or more CPU (741), GPU (742), mass storage (747), ROM (745), RAM (746), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (700), and specifically the core (740) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (740) that are of non-transitory nature, such as core-internal mass storage (747) or ROM (745). The software implementing various aspects of the present disclosure can be stored in such devices and executed by core (740). A computer-readable medium can include one or more memory devices or chips, according to particular needs. The software can cause the core (740) and specifically the processors therein (including CPU, GPU, FPGA, and the like) to execute particular processes or particular parts of particular processes described herein, including defining data structures stored in RAM (746) and modifying such data structures according to the processes defined by the software. In addition or as an alternative, the computer system can provide functionality as a result of logic hardwired or otherwise embodied in a circuit (for example: accelerator (744)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

The use of "at least one of" or "one of" in the disclosure is intended to include any one or a combination of the recited elements. For example, references to at least one of A, B, or C; at least one of A, B, and C; at least one of A, B, and/or C; and at least one of A to C are intended to include only A, only B, only C or any combination thereof. References to one of A or B and one of A and B are intended to include A or B or (A and B). The use of "one of" does not preclude any combination of the recited elements when applicable, such as when the elements are not mutually exclusive.

While this disclosure has described several examples of aspects, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method of video decoding, comprising:

receiving a video bitstream including coded information associated with a current block in a current picture, the coded information indicating that intra template matching prediction (intraTMP) is applied to the current block;

determining a plurality of candidate prediction blocks for the current block based on a cost value between a template of each of the plurality of candidate prediction blocks and a template of the current block according to the intraTMP;

determining a plurality of masks for the plurality of candidate prediction blocks, the respective mask for each of the plurality of candidate prediction blocks including a respective weighting matrix with a plurality of weighting values corresponding to samples in the respective candidate prediction block; and reconstructing the current block based on a fused prediction block that is a sum of weighted prediction blocks, each weighted prediction block being equal to a product of the mask of a respective candidate prediction block of the plurality of candidate prediction blocks and the respective candidate prediction block.

2. The method of claim 1, wherein:

the mask of the respective candidate prediction block has a matrix dimension that is equal to a dimension of the respective candidate prediction block, and each of the plurality of weighting values in the mask of the respective candidate prediction block corresponds to a respective sample of the samples in the respective candidate prediction block.

3. The method of claim 1, wherein the reconstructing further comprises:

selecting one or more candidate prediction blocks from the plurality of candidate prediction blocks when the cost values of the one or more candidate prediction blocks are equal to or less than a threshold value;

determining the weighted prediction blocks based on the selected one or more candidate prediction blocks; and determining the fused prediction block based on the sum of the weighted prediction blocks.

4. The method of claim 1, wherein the reconstructing further comprises:

when one of the plurality of candidate prediction blocks is selected, determining the fused prediction block as a sum of a first weighted prediction block and a second weighted prediction block, the first weighted prediction block being equal to a product of the selected one of the plurality of candidate prediction blocks and a first mask of the plurality of masks, the second weighted prediction block being equal to a product of an intra predictor derived by a planar mode and a second mask of the plurality of masks.

5. The method of claim 4, wherein a sum of a weighting value in a position of the first mask and a weighting value in a collocated position of the second mask is a constant value.

6. The method of claim 1, wherein the determining the plurality of masks further comprises:

determining a plurality of candidate masks for a first candidate prediction block of the plurality of candidate prediction blocks;

applying each of the plurality of candidate masks to the template of the current block and the template of the first candidate prediction block to obtain a plurality of cost values; and determining the mask for the first candidate prediction block from the plurality of candidate masks that corresponds to a minimum cost value of the cost values.

7. The method of claim 1, wherein the reconstructing further comprises:

filtering samples in the sum of the weighted prediction blocks based on a filter; and determining the fused prediction block based on the filtered samples in the sum of the weighted prediction blocks.

8. The method of claim 1, wherein:

the coded information further includes a first flag that indicates whether the current block is predicted using the fused prediction block, and the method further comprises:

when the first flag indicates that the current block is predicted using the fused prediction block, determining the fused prediction block based on the sum of the weighted prediction blocks.

9. The method of claim 1, wherein:

the coded information further includes a second flag that indicates whether the samples in the sum of the weighted prediction blocks are filtered by a filter, and the method further comprises:

when the second flag indicates that the samples in the sum of the weighted prediction blocks are to be filtered by the filter, filtering the samples in the sum of the weighted prediction blocks based on the filter; and determining the fused prediction block based on the filtered samples in the sum of the weighted prediction blocks.

10. A method of video encoding, the method comprising:

determining a plurality of candidate prediction blocks for a current block based on a cost value between a template of each of the plurality of candidate prediction blocks and a template of the current block according to intra template matching prediction (intraTMP);

determining a plurality of masks for the plurality of candidate prediction blocks, the respective mask for each of the plurality of candidate prediction blocks including a respective weighting matrix with a plurality of weighting values corresponding to samples in the respective candidate prediction block; and encoding the current block based on a fused prediction block that is a sum of weighted prediction blocks, each weighted prediction block being equal to a product of the mask of a respective candidate prediction block of the plurality of candidate prediction blocks and the respective candidate prediction block.

11. The method of claim 10, wherein:

the mask of the respective candidate prediction block has a matrix dimension that is equal to a dimension of the respective candidate prediction block, and each of the plurality of weighting values in the mask of the respective candidate prediction block corresponds to a respective sample of the samples in the respective candidate prediction block.

12. The method of claim 10, wherein the encoding further comprises:

selecting one or more candidate prediction blocks from the plurality of candidate prediction blocks when the cost values of the one or more candidate prediction blocks are equal to or less than a threshold value;

determining the weighted prediction blocks based on the selected one or more candidate prediction blocks; and determining the fused prediction block based on the sum of the weighted prediction blocks.

13. The method of claim 10, wherein the encoding further comprises:

when one of the plurality of candidate prediction blocks is selected, determining the fused prediction block as a sum of a first weighted prediction block and a second weighted prediction block, the first weighted prediction block being equal to a product of the selected one of the plurality of candidate prediction blocks and a first mask of the plurality of masks, the second weighted prediction block being equal to a product of an intra predictor derived by a planar mode and a second mask of the plurality of masks.

14. The method of claim 13, wherein a sum of a weighting value in a position of the first mask and a weighting value in a collocated position of the second mask is a constant value.

15. The method of claim 10, wherein the determining the plurality of masks further comprises:

determining a plurality of candidate masks for a first candidate prediction block of the plurality of candidate prediction blocks;

applying each of the plurality of candidate masks to the template of the current block and the template of the first candidate prediction block to obtain a plurality of cost values; and determining the mask for the first candidate prediction block from the plurality of candidate masks that corresponds to a minimum cost value of the cost values.

16. The method of claim 10, wherein the encoding further comprises:

filtering samples in the sum of the weighted prediction blocks based on a filter; and determining the fused prediction block based on the filtered samples in the sum of the weighted prediction blocks.

17. The method of claim 10, wherein the encoding further comprises:

encoding a first flag into a bitstream that indicates whether the current block is predicted using the fused prediction block that is determined based on the sum of the weighted prediction blocks.

18. The method of claim 10, wherein the encoding further comprises:

encoding a second flag into a bitstream that indicates whether the samples in the sum of the weighted prediction blocks are filtered by a filter, the fused prediction block being determined based on filtered samples in the sum of the weighted prediction blocks when the samples in the sum of the weighted prediction blocks are filtered by the filter.

19. A non-transitory computer readable medium storing instruction which, when executed by a processor, cause the processor to perform a method of encoding a video bitstream, the method comprising:

determining a plurality of candidate prediction blocks for a current block based on a cost value between a template of each of the plurality of candidate prediction blocks and a template of the current block according to intra template matching prediction (intraTMP);

determining a plurality of masks for the plurality of candidate prediction blocks, the respective mask for each of the plurality of candidate prediction blocks including a respective weighting matrix with a plurality of weighting values corresponding to samples in the respective candidate prediction block;

encoding the current block into the video bitstream based on a fused prediction block that is a sum of weighted prediction blocks, each weighted prediction block being equal to a product of the mask of a respective candidate prediction block of the plurality of candidate prediction blocks and the respective candidate prediction block; and transmitting the video bitstream.

20. The non-transitory computer readable medium of claim 19, wherein:

the mask of the respective candidate prediction block has a matrix dimension that is equal to a dimension of the respective candidate prediction block, and each of the plurality of weighting values in the mask of the respective candidate prediction block corresponds to a respective sample of the samples in the respective candidate prediction block.

* * * * *